(No Model.) 3 Sheets—Sheet 3.
V. E. EDWARDS.
SHEARS FOR CUTTING RODS WHILE IN MOTION.
No. 505,512. Patented Sept. 26, 1893.
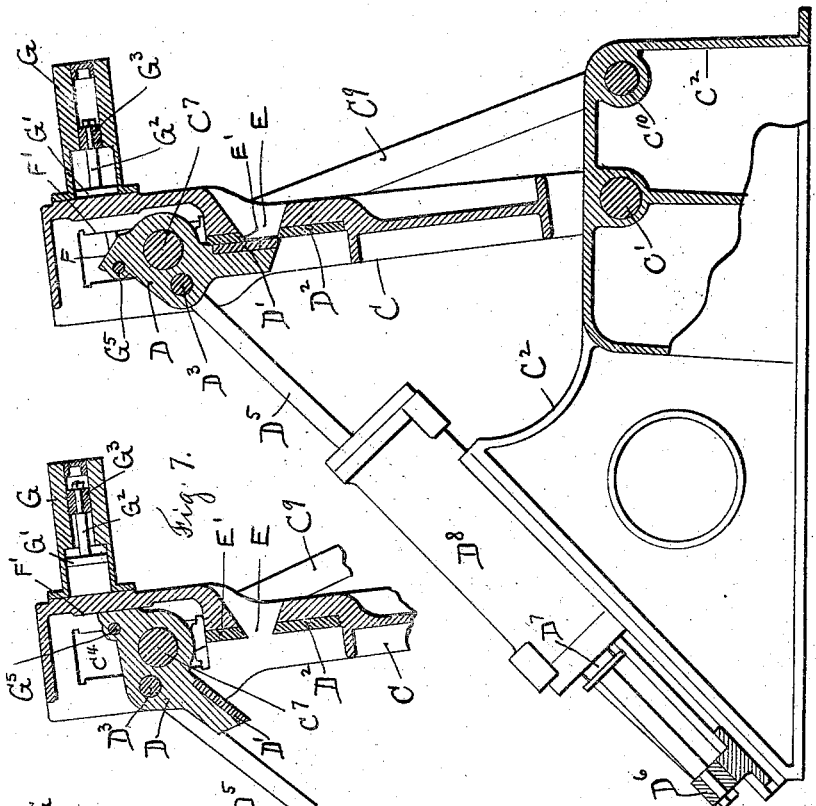
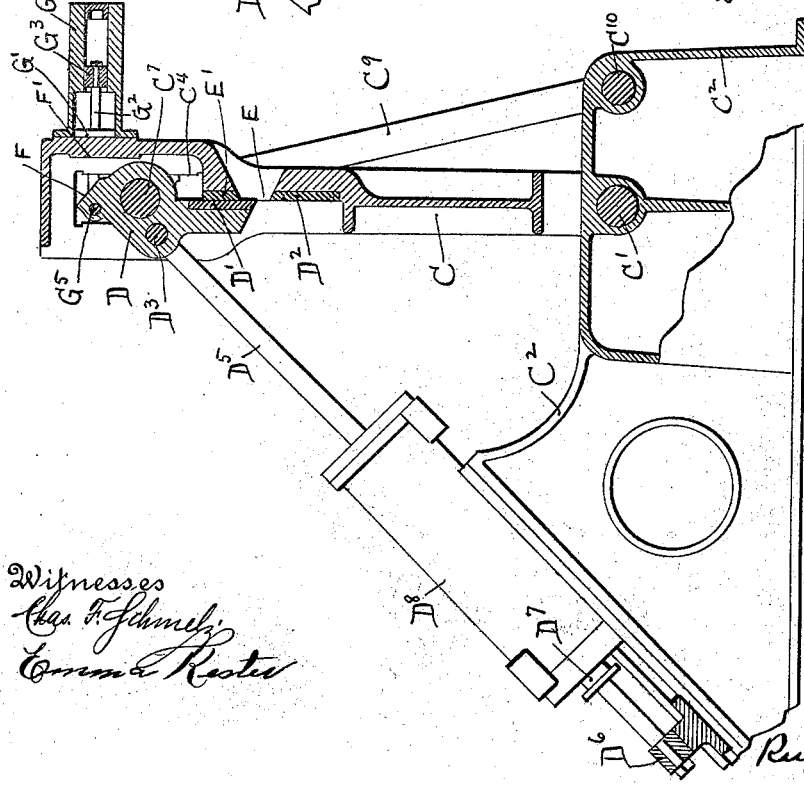
Witnesses
Chas. F. Schmelz
Emma Koster
Inventor
Victor E. Edwards,
By Attorney
Rufus B. Fowler

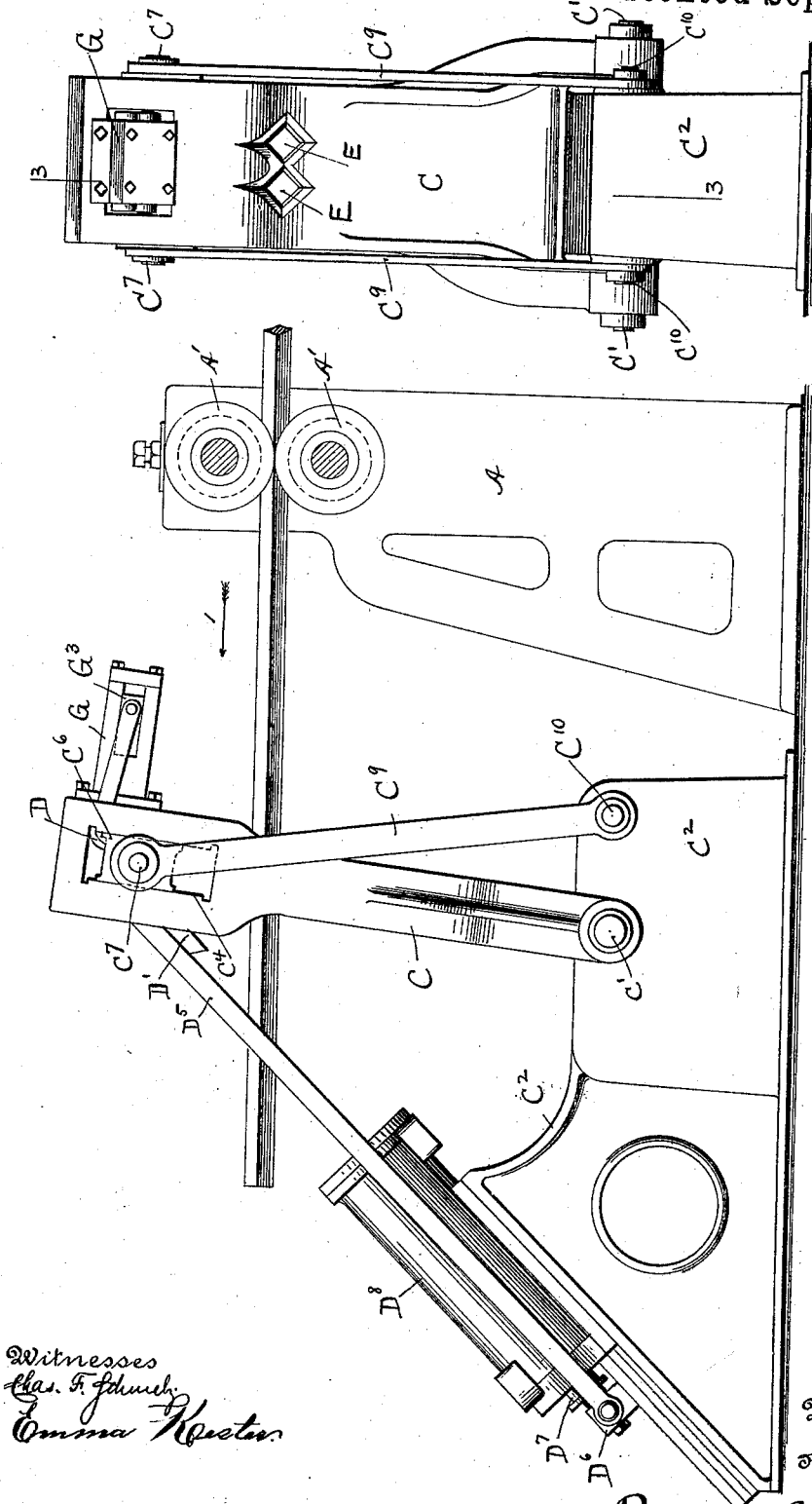

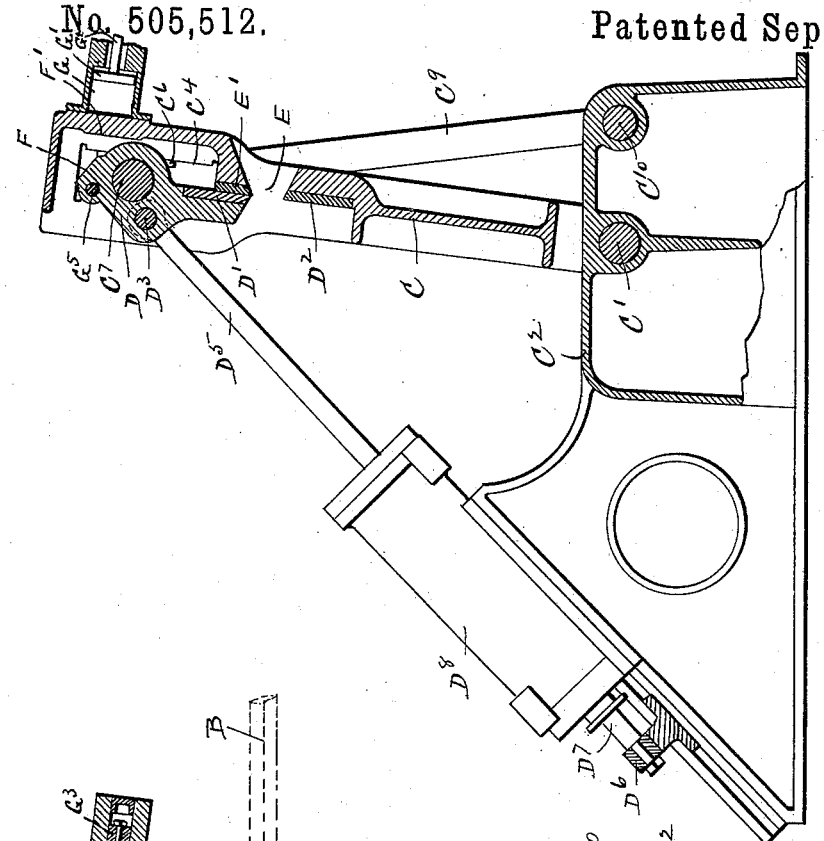
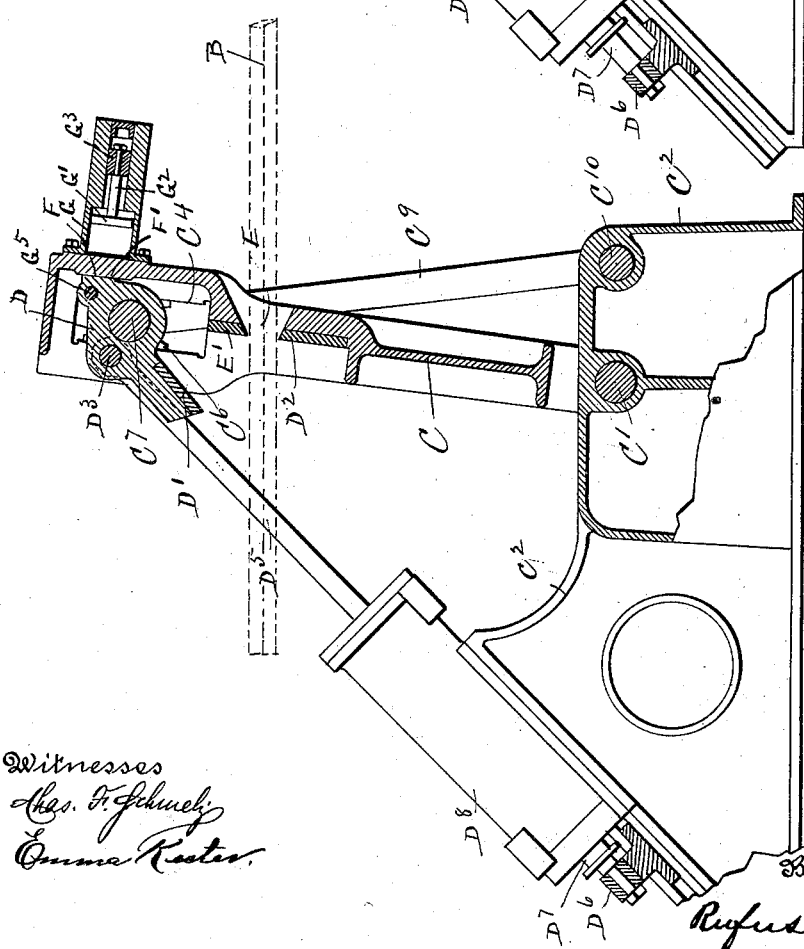

UNITED STATES PATENT OFFICE.

VICTOR E. EDWARDS, OF WORCESTER, MASSACHUSETTS, ASSIGNOR TO THE MORGAN CONSTRUCTION COMPANY, OF SAME PLACE.

SHEARS FOR CUTTING RODS WHILE IN MOTION.

SPECIFICATION forming part of Letters Patent No. 505,512, dated September 26, 1893.

Application filed February 21, 1893. Serial No. 463,270. (No model.)

*To all whom it may concern:*

Be it known that I, VICTOR E. EDWARDS, a citizen of the United States, residing at Worcester, in the county of Worcester and State of Massachusetts, have invented a new and useful Improvement in Shears for Shearing Rods or Billets while in Motion, of which the following is a specification, reference being had to the accompanying drawings, forming a part of the same, and which represent one form of a shearing mechanism embodying my present invention and which will serve to illustrate the nature of my present invention and one method of carrying the same into operation, although I do not confine myself to the specific construction of the mechanism as shown.

Referring to the accompanying drawings: Figure 1 represents a side elevation of shears arranged in combination with and in proper relation to a pair of rolls by which the billet is moved, said shears being adapted to move with the billet as delivered from the rolls and being capable of performing the operation of shearing, or severing the billet while the same is in motion. Fig. 2 represents a rear elevation of the shearing mechanism showing that side nearest the rolls and Figs. 3, 4, 5, 6 and 7 represent sectional views of the shearing mechanism on line 3—3, Fig. 2 and show the different positions assumed by the moving parts at different periods in the operation of the shears.

Similar letters refer to similar parts in the different figures.

The object of my present invention is to provide a mechanism for severing a continuous billet, or rod into desired lengths as it is delivered from a rolling mill and while in motion; by means of a pair of blades, provided with cutting edges, moved relatively to each other in a direction parallel to their plane of contact, so as to secure a true shearing action to the cutting blades; and this object is accomplished by the mechanism represented in the accompanying drawings and hereinafter described, although the specific construction represented by the accompanying drawings may be varied in many particulars without departing from the scope of my invention. The mechanism represented in the accompanying drawings is, therefore, intended to show only one form in which my invention can be embodied and to illustrate the nature and character of the invention itself, which consists broadly in the employment with a rolling mill, by which the billet is projected forward, of a shearing mechanism, comprising two cutting blades arranged to act upon a billet, or rod, to sever the same by a shearing action, or by a relative movement of one or both of the blades in a direction parallel to their plane of contact and a moving frame-work by which said cutting blades are carried and capable of a simultaneous movement in a direction nearly coincident with the line of motion of the billet.

Referring to the accompanying drawings, A denotes the supporting stand, or housing for a pair of rolls A', A', by which a billet B is projected forward in the direction of the arrow 1.

Contiguous to and behind the rolls A', I place a shearing mechanism, consisting in the present instance, of a swinging frame C pivoted at C' to a stationary bed $C^2$ and provided at its upper end, and upon opposite sides, with the vertical ways $C^3$ and $C^4$, in which are placed the blocks $C^5$ and $C^6$ capable of a limited sliding movement in said ways. The blocks $C^5$ and $C^6$ carry a fixed spindle $C^7$ to the outer ends of which, I pivot the links $C^8$ and $C^9$. The links $C^8$ and $C^9$ have their opposite ends pivoted at $C^{10}$ to the bed $C^2$. The blocks $C^5$ and $C^6$ and pin $C^7$ fixed therein, constitute a crosshead which is connected with stationary bed $C^2$, by means of the links $C^8$ and $C^9$, causing the crosshead to have a limited sliding motion in the ways $C^3$, $C^4$, as the frame C is rocked upon the pivot C' back and forth between the positions represented in Figs. 3 and 6, respectively.

Pivoted upon the spindle $C^7$ and between the sliding blocks $C^5$, $C^6$, is a shear block D, to which is attached the upper cutting blade D', arranged to act conjointly with a lower fixed blade $D^2$ attached to the frame-work C. The shear block D carries a pin $D^3$ projecting upon opposite sides of the block and forming a pivotal connection for the links $D^4$ and $D^5$, by which the shearing block is connected with a reciprocating crosshead $D^6$, attached to the end of a piston rod D⁷ carried by a piston, not shown, within a hydraulic cylinder D⁸.

Water is admitted to the cylinder D⁸, by means of any suitable valve mechanism now known for the purpose, and the reciprocating motion of the crosshead D⁶ through the connecting links D⁴ and D⁵, will cause the frame C to be rocked back and forth, between the two positions shown in Figs. 3 and 6, respectively.

In Figs. 1 and 3 the shearing mechanism is represented in position to receive the billet through the opening E, and above the lower cutting blade D² as represented by the broken lines B, Fig. 3. When it is desired to sever the billet which has been delivered from the rolls A', A', and received in the opening E, water is admitted to the hydraulic cylinder D⁸ upon the upper side of its piston, to move the crosshead D⁶ downward and rock the frame C into the position shown in Fig. 6 and as the pin D³ by which the links D⁴ and D⁵ are pivoted to the rocking shear block D, is placed in front of and above the spindle C⁷, the downward movement of the crosshead D⁶, will first cause the shear block to be rocked on the spindle C⁷ until the cutting blade D' is brought in contact with a fixed stop E' on the frame of the machine and with the upper cutting blade in proper position to be moved parallel to its plane of contact with the lower cutting blade D². The continued downward motion of the crosshead D⁶, will then draw the frame C over into the position shown in Fig. 6, causing the spindle C⁷ and blocks C⁵ and C⁶ to be drawn down in the ways C³ and C⁴ by means of the links C⁸ and C⁹, carrying the shear block D downward and causing the cutting blades D' and D² to sever the billet.

The position of the upper cutting blade D' resting against the fixed stop E' and at the beginning of its downward movement is shown in Fig. 4; the position of the upper blade midway its downward movement is represented in Fig. 5 and the position of the upper cutting blade at the end of its downward movement and at the completion of the rocking movement of the frame C is shown in Fig. 6. When the frame C has reached the limit of its forward movement and the downward motion of the blade D' effected the severance of the billet, the momentum of the operating parts will cause the shear block D to be rocked on its spindle C⁷, throwing the blade D' forward and out of contact with the fixed stop E', until the face F at the upper end of the shear block D strikes against the frame at F', in the position shown in Fig. 7. Water is admitted to the cylinder D⁸ upon the lower side of its piston and the frame C moved back into the position represented in Figs. 1 and 3. During the backward movement of the frame C, the pushing force exerted through the links D⁴ and D⁵ upon the pin D³ will be in a line above the axis of the shear block D and will prevent the shear block from rocking upon the spindle C⁷ until the force of the water pressure is applied to again pull the frame C forward.

In order to prevent the rocking motion of the shear block D, from striking the fixed stops E' and F' with too great force I have connected with the shear block a mechanism by which the blow, in either direction, is cushioned.

To the side of the frame C, I attach an air cylinder G containing a reciprocating piston G' and having a piston rod G² and crosshead G³, which is connected with the shear block D by links G⁴, pivoted to the shear block by a pin G⁵, so the rocking motion of the shear block D, will cause a reciprocating motion of the piston G' within the air cylinder G. At opposite ends of the cylinder G, I provide small holes or ports, not shown, through which air is allowed to enter the cylinder and is slowly forced out upon opposite sides, alternately, by the reciprocating motion of the piston.

The admission of water to the cylinder D⁸ is regulated by the partial opening of its port, so as to control the speed of the frame C, as it is moved from the position shown in Figs. 1 and 3 to the position shown in Fig. 6, and cause the cutting blades while in contact with the billet to be carried by the frame C at the same speed as the billet.

I have shown the carrying frame C, as pivoted to C' to the fixed bed C² as a convenient arrangement; but it will be obvious that when the carrying frame is moved with an angular motion, the cutting blades in contact with the billet will be moved in the arc of a circle instead of a straight line, and should this movement of the blades be deemed objectionable, the carrying frame can be arranged to slide along ways parallel with the line of motion of the billet, and one, or both, of the cutting blades can be connected by links with a fixed point and caused to move toward the billet during the sliding motion of the carrying frame. In case the carrying frame is pivoted in the manner shown, the upper blade can be fixed in the carrying frame and a sliding motion imparted to the lower of the cutting blades, by means of a link connection with the fixed framework. These modifications which I have suggested, can readily be made by any mechanic of ordinary skill and they would clearly come within the scope of my present invention. I am well aware that rotating blades have been employed to sever a billet, or rod, while in motion, such blades acting upon the billet, or rod, by a "pinching" rather than a "shearing" action and I do not herein claim such.

I do not confine myself to the employment of a hydraulic cylinder and the connecting mechanism as shown for the purpose of actuating the carrying frame, as it is obvious that many other known forms of actuating mechanism can be used for that purpose.

What I claim as my invention, and desire to secure by Letters Patent, is—

1. The combination with a pair of rolls, adapted to roll a billet and deliver the same to a shearing mechanism, of a shearing mechanism comprising a carrying frame capable of being moved away from said rolls and substantially in the plane of the billet delivered thereto, operative mechanism by which said carrying frame is moved with a speed equal to the speed of the billet, as it is delivered by said rolls, and a pair of cutting blades carried by said frame and adapted to sever the billet and operating mechanism by which said blades are operated to sever the billet synchronously with the forward movement of said carrying frame, substantially as described.

2. The combination with a pair of rolls, by which a billet is projected forward, of a carrying frame arranged in the path of the billet, as it is delivered from said rolls, mechanism by which said frame is moved forward with a speed equal to the speed of the billet, a fixed cutting blade carried by said frame, a movable blade carried by said frame and adapted to act conjointly with said fixed blade in severing the billet, and mechanism by which said movable blade is moved synchronously with the forward movement of said carrying frame, substantially as described.

3. The shearing mechanism adapted for shearing a billet, while the billet is in motion, and consisting of a frame arranged to move in the direction of the moving billet, mechanism by which said frame is moved with the speed of the moving billet a determined distance, a shearing device carried by said frame and actuating mechanism by which said shearing device is operated to sever the billet synchronously with the forward motion of said carrying frame, substantially as described.

4. The combination with a frame placed in the path of a moving billet, mechanism by which said frame is moved with the billet and at equal speed, a fixed cutting blade carried by said frame, a movable blade carried by said frame, mechanism by which said movable blade is moved to act conjointly with said fixed blade in shearing the billet, said movable blade being pivoted so the momentum, as the frame is stopped, will cause the movable blade to rock and clear the billet, substantially as described.

5. The combination with a supporting frame-work arranged in the path of a moving billet, of a fixed cutting blade supported by said frame-work, a crosshead capable of sliding in ways on said frame-work, a reciprocating cutting blade carried by said crosshead and arranged to act conjointly with said fixed cutting blade in severing a billet, said reciprocating blade having a pivotal connection with said crosshead, by which it is capable of an angular movement, in order to clear the passage for the moving billet, substantially as described.

6. The combination in a shearing mechanism adapted to sever a billet while the billet is in motion, of a carrying frame arranged in the path of the billet, cutting blades carried by said frame and arranged to act conjointly in severing a billet interposed between them, one of said cutting blades being capable of an angular motion, whereby the billet is released, and actuating mechanism, by which said frame and said cutting blades are operated, substantially as described.

7. The combination of mechanism for moving a billet longitudinally and delivering the same between the blades of a shearing mechanism, a carrying frame arranged in the path of the billet and capable of moving with said billet, a shearing mechanism carried by said frame, arranged to close in order to sever the billet and to open in order to release the same, mechanism by which said carrying frame is moved forward in the direction of a moving billet, a limited distance, and then reversed in order to provide for the succeeding operation of the shearing mechanism, and mechanism by which said shearing mechanism is closed to sever the billet synchronously with the forward motion of the carrying frame and held open during the reverse motion of said carrying frame, substantially as described.

8. The combination of a frame pivoted upon a fixed bed, and capable of a limited angular motion, actuating mechanism by which said frame is moved, a fixed blade held by said frame, a blade capable of a reciprocating motion in said frame, so as to act conjointly with said fixed blade, actuating mechanism by which said blade is moved to sever the billet during the motion of said frame in one direction, substantially as described.

9. The combination of a pivoted carrying frame, capable of an angular motion, a shearing mechanism carried by said frame and comprising a pair of blades arranged to open, to receive a moving billet and to close and sever the billet during the motion of said frame in one direction, mechanism by which said frame is moved along with the moving billet, and mechanism by which said blades are closed synchronously with the forward motion of said frame, substantially as described.

10. The combination of a pivoted frame, mechanism by which said frame is moved in a limited arc of a circle, a fixed blade held in said frame, a movable blade acting conjointly with said fixed blade and a link by which said movable blade is connected with the fixed frame-work, whereby motion will be imparted to said movable blade during the angular motion of said frame, substantially as described.

11. The combination of a pivoted frame, provided with ways, a crosshead arranged to slide in said ways, links connecting said crosshead with the fixed frame-work, a fixed cutting blade held by said pivoted frame, a movable cutting blade carried by said crosshead and mechanism by which said pivoted frame is moved through a limited arc, substantially as described.

12. The combination of a pivoted frame, provided with ways, a crosshead arranged to slide in said ways, links by which said crosshead is connected with the fixed frame-work, a fixed cutting blade held by said pivoted frame, a shear block pivoted on said crosshead, a cutting blade carried by said shear block and actuating mechanism pivoted to said shear block, by which said shear block is rocked and said pivoted frame is moved through an arc of a circle, substantially as described.

13. The combination of a pivoted frame, fixed blade carried by said frame, a crosshead carried by said frame and capable of a sliding motion, a shear block pivoted on said crosshead, a cutting blade carried by said shear block, links by which said crosshead is connected with the fixed frame-work, actuating mechanism for imparting an angular motion to said pivoted frame, said actuating mechanism being pivoted to said shear block, so as to rock said shear block and fixed stops carried by said pivoted frame, by which the rocking motion of said shear block is limited, substantially as described.

14. The combination with a frame C, having an angular movement and a shear block carried by said frame and capable of a rocking movement, stops by which the rocking motion of said shear block is limited and an air cylinder provided with ports of limited area and a piston sliding in said cylinder and operatively connected with said rocking shear block, whereby the contact of said shear block with said fixed stops is cushioned, substantially as described.

Dated this 16th day of February, 1893.

VICTOR E. EDWARDS.

Witnesses:
CHAS. H. MORGAN,
RUFUS B. FOWLER.